US007147267B2

(12) United States Patent
Bittner et al.

(10) Patent No.: US 7,147,267 B2
(45) Date of Patent: Dec. 12, 2006

(54) DEVICE FOR PIVOTING A VEHICLE DOOR OR A VEHICLE LID

(75) Inventors: Eric Bittner, München (DE); Thomas Humez, Dachau (DE); Stephan Schachtl, München (DE); Holger Zang, Dachau (DE)

(73) Assignee: Valeo Sicherheitssysteme GmbH, Erdweg (DE)

( * ) Notice: Subject to any disclaimer, the term of this patent is extended or adjusted under 35 U.S.C. 154(b) by 104 days.

(21) Appl. No.: 10/511,985

(22) PCT Filed: May 16, 2003

(86) PCT No.: PCT/EP03/50169

§ 371 (c)(1), (2), (4) Date: Oct. 21, 2004

(87) PCT Pub. No.: WO03/097979

PCT Pub. Date: Nov. 27, 2003

(65) Prior Publication Data

US 2005/0150078 A1 Jul. 14, 2005

(30) Foreign Application Priority Data

May 18, 2002 (DE) ................................ 102 22 298

(51) Int. Cl.
*B60J 5/00* (2006.01)

(52) U.S. Cl. ............................... 296/146.4; 296/146.8; 296/146.11; 49/335

(58) Field of Classification Search ............ 296/146.1, 296/146.4, 146.8, 146.11; 49/334, 335
See application file for complete search history.

(56) References Cited

U.S. PATENT DOCUMENTS

| | | | | |
|---|---|---|---|---|
| 6,056,348 | A | 5/2000 | Tsuda et al. | |
| 2003/0102692 | A1* | 6/2003 | Mooy et al. | 296/146.11 |
| 2006/0082186 | A1* | 4/2006 | Bals | 296/146.1 |

FOREIGN PATENT DOCUMENTS

| | | | |
|---|---|---|---|
| DE | 92 04 030 | U | 5/1992 |
| DE | 10259106 | A1 * | 7/2004 |

* cited by examiner

*Primary Examiner*—Jason Morrow
(74) *Attorney, Agent, or Firm*—Berenato, White & Stavish

(57) ABSTRACT

A device having a drive (6) for pivoting a vehicle door or vehicle lid rotationally connected to a hinge bow (1) around a hinge axle (3). In order to build the device (5) in a compact manner, wherein no special reinforcement of the hinges of the vehicle door or vehicle lid is required for utilization of the device (5) in compliance with regulations, a drive (6) is provided with a drive shaft (7) that is arranged in an extension of the hinge axle, the drive shaft (7) being connected to a bow-shaped drive lever (9) that is arranged parallel to the hinge bow (1) and that can be fixed to the hinge bow (1).

6 Claims, 2 Drawing Sheets

DEVICE FOR PIVOTING A VEHICLE DOOR OR A VEHICLE LID

BACKGROUND OF THE INVENTION

1. Field of the Invention.

The invention relates to a device for pivoting a vehicle door or a vehicle lid (rear opening, engine hood, etc.), which is connected in a rotationally fixed manner to a hinge bracket, about a hinge pin.

2. Description of the Related Art

Such a device is known, for example, from DE 200 04 973 U1. This known device comprises a drive with a lever mechanism in the case of which a crank lever acts on the hinge bracket of the rear opening of the vehicle via two bracket-like drive levers which extend in the axial direction of the vehicle and are arranged one behind the other. In this case, the drive lever which is directed toward the hinge bracket acts on a region of the hinge bracket which is spaced apart from the hinge pin. This known device has, inter alia, the disadvantage that it takes up a relatively large amount of space.

A device in which the drive is connected to the hinge pin of the respective rear opening is also known. Although such known devices can be arranged in the corresponding vehicle in a more space-saving manner than the device disclosed in DE 200 04 973 U1, it has been found that, in order to transmit the forces from the drive to the rear opening, the hinges have to be reinforced in relation to conventional rear-opening hinges. As a result, in the case of vehicles of the same type, but without a drive for automatic actuation of the rear opening, either it is necessary to use different (weaker) hinges than for vehicles with a drive for automatic rear-opening actuation or, in the case of the vehicles without a drive, it is necessary for the hinges to be over-sized.

SUMMARY OF THE INVENTION

The object of the invention is to specify a device of the type mentioned in the introduction which is of space-saving construction and, when used as intended, does not require any particular reinforcement of the vehicle-door or vehicle-lid hinges.

The invention is essentially based on the idea of providing a device with a drive which comprises a drive shaft which is arranged in extension of the hinge pin but, rather than acting on the hinge pin, is connected to a bracket-like drive lever which is arranged parallel to the hinge bracket and can be fastened thereto.

As a result of such a device, on the one hand, a lateral arrangement of the drive—as in the case of devices for pivoting the hinge pin directly—makes a space-saving construction of the device possible. On the other hand, use of the additional drive lever, which transmits the torque to the vehicle door or vehicle lid, means that there is no need for any over-sized hinge.

The drive shaft and the drive lever may be connected in a force-fitting and/or form-fitting manner.

In order to ensure satisfactory centering of the drive shaft, it has proven expedient if, on its side which is directed away from the drive shaft, the drive lever has a bearing bushing which can be plugged onto a bearing journal provided at the end of the hinge pin. Of course, it is also possible for the drive shaft to be guided through the drive lever and be connected directly to the hinge pin.

BRIEF DESCRIPTION OF THE DRAWINGS

Further details and advantages of the invention can be gathered from the following exemplary embodiments which are illustrated with reference to FIGS., in which.

DETAILED DESCRIPTION OF THE PREFERRED EMBODIMENTS

In the FIGS., 1 designates a hinge bracket which can be fastened, via flange parts 2, on the roof side region of a rear opening (not illustrated) of a motor vehicle. The hinge bracket 1 is arranged such that it can be pivoted about a hinge pin 3, which is mounted in a rotationally fixed manner in a retaining frame 4 which can be fastened on the bodywork of the motor vehicle.

Figure 1:
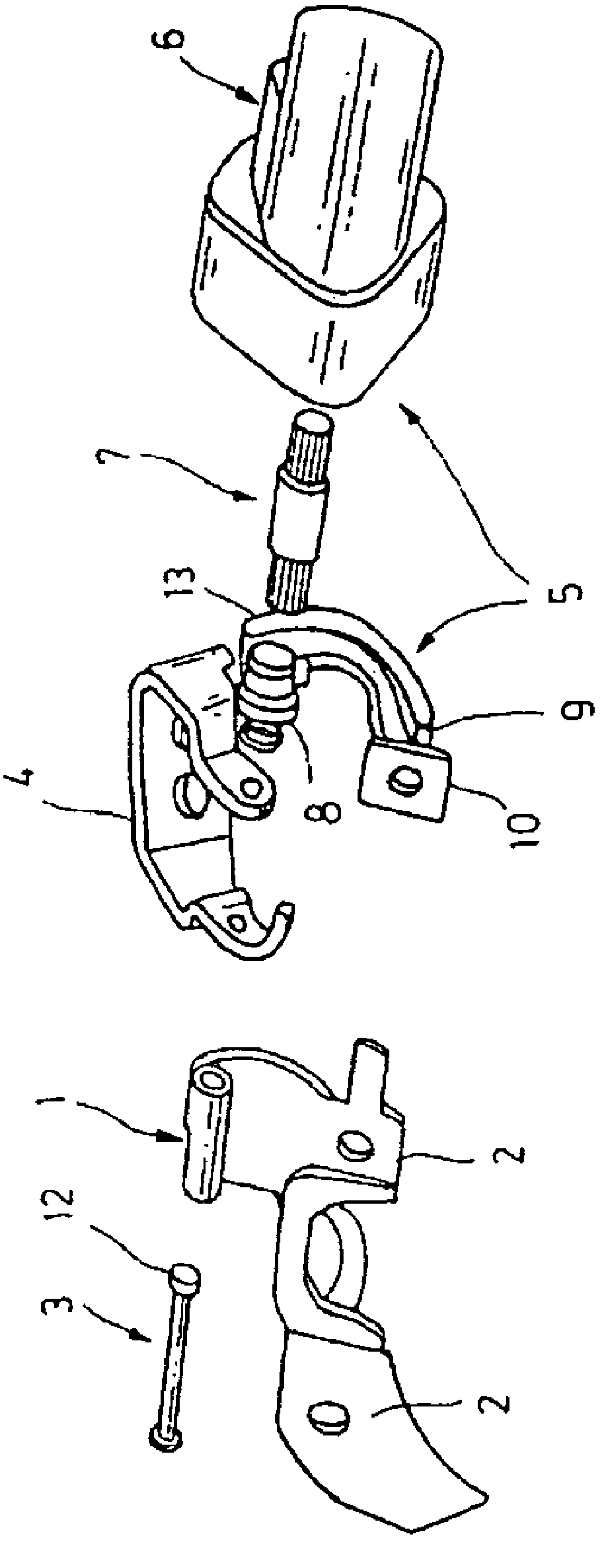
FIG. 1 shows an exploded illustration of a device according to the invention with a hinge bracket and hinge pin of a rear opening of a vehicle.
Figure 4:
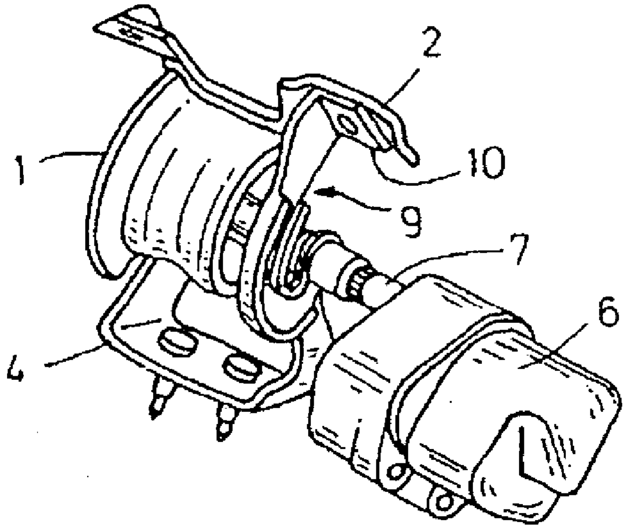

The device according to the invention (FIGS. 1 and 4), which is designated 5, comprises a drive (e.g. an electric motor with downstream toothed gear mechanism) and a drive shaft 7 extending in the direction of the hinge pin 3. The drive shaft 7 is connected in a rotationally fixed manner to the first end 8 of a bracket-like drive lever 9 arranged essentially parallel to the hinge bracket 1. The second end 10 of the bracket-like drive lever 9 can be connected to one of the two flange parts 2 of the hinge bracket 1. It is possible here for the hinge bracket 1 and drive lever 9 to be connected via a screw (not illustrated), by means of which the rear opening hood (not illustrated either) is fastened on the hinge bracket 1.

For the purpose of centering the drive shaft 7, on its side which is directed away from the drive shaft 7, the drive lever 9 has a bearing bushing 11 which is arranged such that it can be plugged onto a bearing journal 12 provided at the end of the hinge pin 3.

Figure 2:
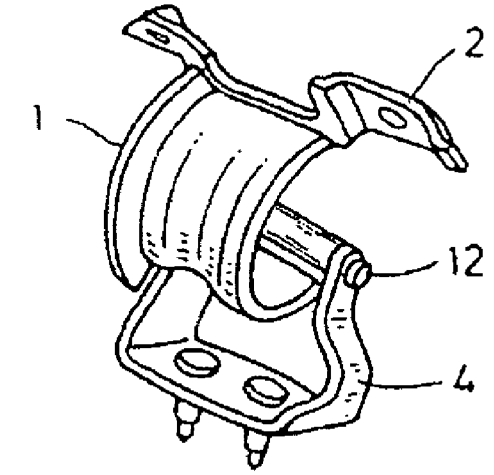
FIGS. 2–4 show perspective views representing the individual assembly stages during the production of the device according to the invention.

For the purpose of assembling the device 5 according to the invention, in the first instance, the hinge pin 3 is connected to the hinge bracket 1 and the retaining frame 4 (FIG. 2). This arrangement essentially corresponds to a standard hinge arrangement for motor vehicles in the case of which there is no drive provided for automatic actuation of the rear opening. It is merely the bearing journal 12, which is provided on the hinge pin 3 and projects laterally to some extent beyond the retaining frame 4, which is not usually present in the case of known hinge arrangements of this type.

Figure 3:
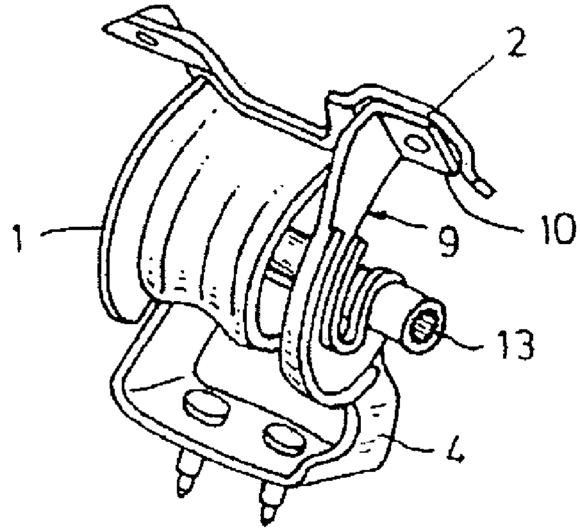

If a motor vehicle is to be provided with the device 5 according to the invention, the drive lever 9 is then plugged onto the laterally projecting bearing journal 12 of the hinge pin 3 and the second end 10 of the drive lever 9 is fastened on the flange part 2 by a rear opening hood screw (not illustrated) (FIG. 3).

Finally, the drive shaft 7, which is connected to the drive 6, is plugged into a mount 13 of the drive lever 9 and the drive 6 is connected (screwed) to the vehicle bodywork (not illustrated). In this case, the mount 13 of the drive lever 9 and that end of the drive shaft 7 which is directed toward the mount 13 are designed such that these parts are connected in a rotationally fixed manner.

LIST OF DESIGNATIONS

1 Hinge bracket
2 Flange part
3 Hinge pin
4 Retaining frame
5 Device
6 Drive
7 Drive shaft
8 First end
9 Drive lever
10 Second end
11 Bearing bushing
12 Bearing journal
13 Mount

The invention claimed is:

1. A device for pivoting a vehicle door or a vehicle lid, which is connected in a rotationally fixed manner to a hinge bracket (1), about a hinge pin (3), having the following features:

a) the device (5) comprises a drive (6) and a drive shaft (7) which is connected to the drive (6) and extends in the direction of the hinge pin (3);

b) the drive shaft (7) connected in a rotationally fixed manner to the first end (8) of a bracket-shaped drive lever (9) arranged substantially parallel to the hinge bracket (1), said drive lever (9) being fixed to an end of said hinge pin;

c) the second end (10) of the bracket-shaped drive lever (9) connected to the hinge bracket (1).

2. The device as claimed in claim 1, characterized in that the drive shaft (7) is connected in at least one of a force-fining and a form-fitting manner to the drive lever (9).

3. The device as claimed in claim 1, characterized in that, on its side which is directed away from the drive shaft (7), the drive lever (9) has a bearing bushing (11) which can be plugged onto a bearing journal (12) provided at the end of the hinge pin (3).

4. The device as claimed in claim 1, characterized in that the drive lever (9) and the hinge bracket (1) are fastened to one another in a releasable manner.

5. The device as claimed in claim 1, characterized in that the drive lever (9) is adapted to be fastened on a flange part (2) of the hinge bracket (1) which serves, at the same time, for fastening the hinge bracket (1), to the vehicle door or vehicle lid.

6. A device for pivoting a vehicle door or a vehicle lid, which is connected in a rotationally fixed manner to a hinge bracket (1), about a hinge pin (3), comprising:

a) a drive (6) for generating drive torque and a drive shaft (7) which is connected to the drive (6) and extends in the direction of the hinge pin (3);

b) the drive shaft (7) being connected in a rotationally fixed manner to the first end (8) of a drive lever (9) arranged substantially parallel to the hinge bracket (1), said drive lever (9) being interposed between said drive and said hinge bracket;

c) the second end (10) of the drive lever (9) adapted to be connected to the hinge bracket (1).

* * * * *